W. A. SWAYZE.
CURTAIN LIGHT FRAME.
APPLICATION FILED MAR. 1, 1920.
1,431,706.                                                    Patented Oct. 10, 1922.
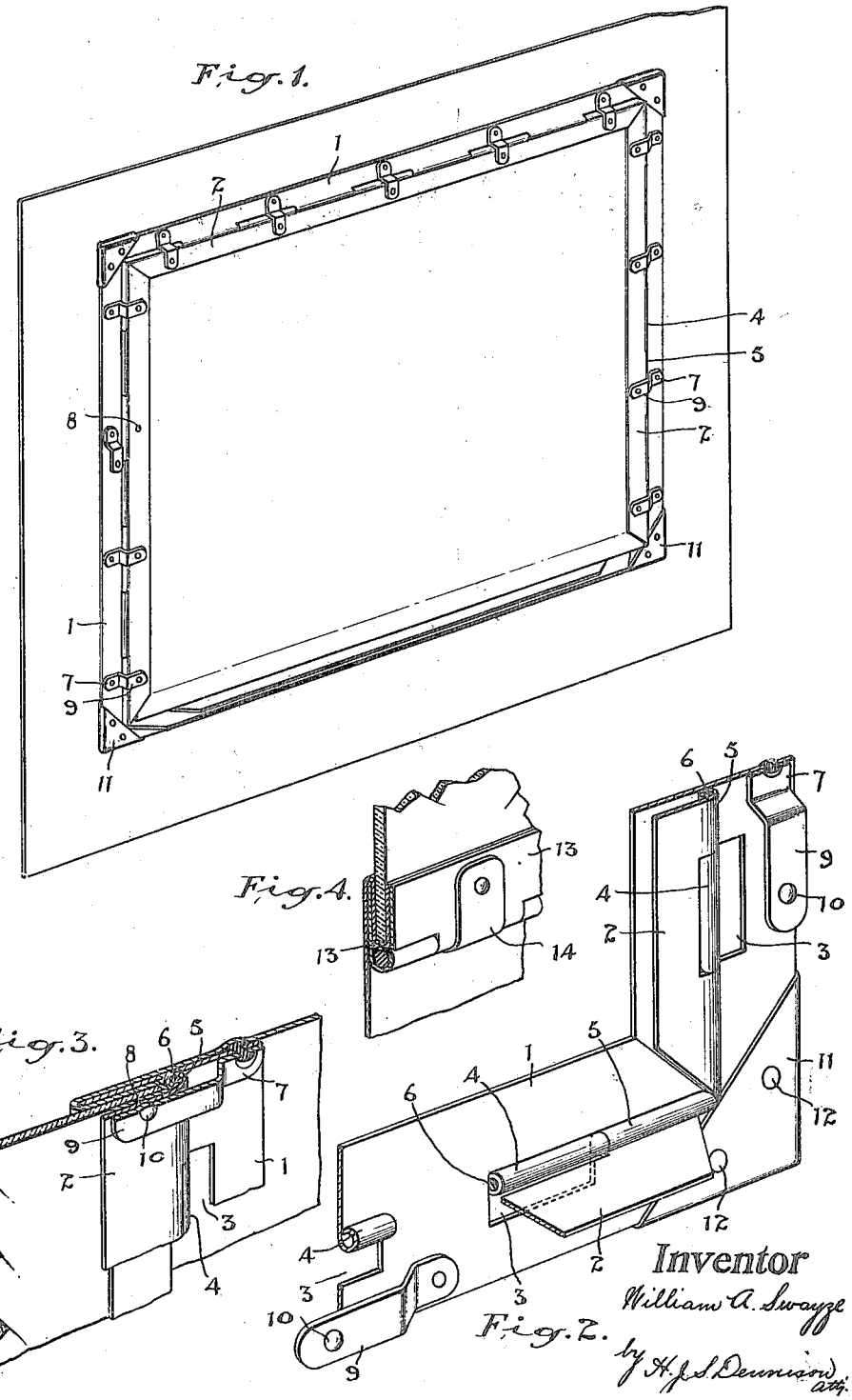

Patented Oct. 10, 1922.

1,431,706

UNITED STATES PATENT OFFICE.

WILLIAM A. SWAYZE, OF TORONTO, ONTARIO, CANADA.

CURTAIN-LIGHT FRAME.

Application filed March 1, 1920. Serial No. 362,189.

*To all whom it may concern:*

Be it known that I, WILLIAM A. SWAYZE, a subject of the King of Great Britain, and resident of the city of Toronto, county of York, Province of Ontario, in the Dominion of Canada, have invented certain new and useful Improvements in Curtain-Light Frames, described in the following specification and illustrated in the accompanying drawings, that form part of the same.

The principal object of this invention is to enable the use of glass lights in the curtains of automobile tops and to devise a frame structure which will enable the curtain maker to fit the frame to any size or shape of curtain.

The principal feature of the invention consists in the formation of a sheet metal strip which will house the edge of the glass and secure it firmly in place and which may be cut to any desirable length and formed into frames.

In the drawings, Figure 1 is a perspective view of my improved light frame shown attached to a curtain.

Figure 2 is an enlarged perspective detail of a corner of the frame showing one of the hinged securing members in the open position.

Figure 3 is an enlarged sectional perspective detail through the frame glass and curtain.

Figure 4 is a sectional perspective view of a modified form of frame.

The use of glass lights in the curtains of automobile tops is extremely desirable instead of celluloid which has been almost exclusively used for a long period, because the celluloid becomes fogged by the action of the weather. It also becomes very brittle and breaks and it is also dangerous because of its inflammability.

The present invention has been devised with the purpose of enabling the auto top maker to fit glass lights into any shape or size of curtain and in order to accomplish this object, I have produced a metal strip which can be made in long lengths and can be cut in any desirable length to suit the size of light required in a similar manner to the cutting of picture moulding, that is to say, the metal strip is mitre cut and the mitered ends are fitted together to form the frame and this is fastened to the curtain and made weather-proof in a very simple and effective manner.

The frame structure as shown in the accompanying drawings comprises a strip of sheet metal 1 which forms the base of the frame and a sheet metal strip 2 of a narrower width than the strip 1 which is secured to the strip 1 intermediate of its width in such a manner as to form a pocket into which the edge of the glass and the fabric of the curtain is inserted and secured. The strip 2 may be fastened in various ways, but in the form herein shown the strip 1 is formed with rectangular perforations 3 at regular intervals, the metal being cut on three sides of said perforations and the strip thus cut is rolled to form a hinged bead 4.

The strip 2 is formed with corresponding bead portions 5 on one edge adapted to fit between the bead portions 4 of the strip 1 and a wire 6 is passed through these beads, thus attaching the strip 2 to the strip 1 by means of a continuous hinge.

It will be seen that when the strip 2 is swung toward the inner edge of the strip 1 the thickness of the beads 4 and 5 forms a pocket space which is sufficient to receive the glass and a double thickness of the curtain fabric so that the fabric may be turned inwardly over the inner edge of the strip 1, the glass laid thereon and the fabric then turned back over the glass to protect it and support it in a cushion and the outer holder strip 2 will then close over the outer side.

Suitable means are provided to hold the strip 2 in place when thus folded down, such means being here shown in the form of metal strips 7 secured to the outward surfaces of the strip 1 near the outer edge by suitable rivets and being offset outwardly so as to extend over the hinged strip 2.

The strip 2 is preferably formed with indentations 8 at points opposite to the rivets securing the members 7 and the free offset ends 9 of the members 7 are provided with indented teats 10 to fit into said indentations to keep the members 7 from turning after they have been set in position.

It will be readily understood that a metal strip such as described may be cut at any desirable point and a frame of any dimensions or shape may be constructed by simply fitting the pieces together at the mitred ends.

Corner pockets 11 of sheet metal are formed to slip over the mitred corners of the frame and these are secured by suitable rivets 12.

A strong and durable frame is thus produced which will be extremely thin, will hold the glass securely in such a manner that it will not be readily broken and it will be seen that the frame can be made to suit any requirement and it will not be unduly bulky or cumbersome to handle. A hinged joint extending longitudinally of each member of the frame stiffens it and renders the structure very neat, but it must be understood that the hinged joint is not absolutely essential as the outer folding member may be otherwise secured to the base member 1.

In the form shown in Fig. 4, two strips 13 are hinged together at their outer edges and held to grip the glass by U-shaped spring clips 14.

What I claim as my invention is:—

1. A curtain light frame comprising, a pair of sheet metal strips hinged together to form a longitudinally recessed member adapted to be cut in desirable lengths to house the edges of the glass and the curtain.

2. A curtain light frame, comprising a sheet metal strip having rectangular perforations arranged at regular intervals in its length, the metal being cut on three sides of the perforations and the cut portions being rolled to form hinge beads, a sheet metal strip having spaced hinge beads projecting from one edge and adapted to fit between the hinge beads of the other strip, and a wire connecting said beads.

WILLIAM A. SWAYZE.